UNITED STATES PATENT OFFICE.

HUBERT A. RICHTER, OF LONG ISLAND CITY, NEW YORK.

INSECTICIDE.

1,324,848.      Specification of Letters Patent.      Patented Dec. 16, 1919.

No Drawing.      Application filed August 18, 1917. Serial No. 186,848.

*To all whom it may concern:*

Be it known that I, HUBERT A. RICHTER, a citizen of the United States, residing at Long Island City, Queens county, State of New York, have invented certain new and useful Improvements in Insecticides, of which the following is a specification.

My invention relates to insecticides and more particularly to a composition of matter for insecticidal purposes to be prepared, kept and distributed as a dry powder.

It is the object of my invention to provide an insecticide of the class described which may be easily prepared of materials readily obtainable, may be kept indefinitely without undergoing change and without loss of its insecticidal properties, is in concentrated form and may be distributed either by manual dusting or by means of any usual type of blowing apparatus such as is employed by gardeners, for example.

A further object of my invention is to provide an insecticide of the class described which will be destructive of insect life generally, including both such insects and vermin as infest places of human habitation, stables and other buildings, and also such insect life as feeds upon, injures or destroys the various plants and vegetable growths valuable to man.

As an insecticide for destroying insects and parasitic animal life connected with growing plants and vegetables my improved composition will be found particularly valuable as against potato bugs, chinch bugs, army worms, flies, lice, caterpillars and insects of various descriptions.

My insecticide as herein described destroys the cotton boll-weevil quickly and effectively.

In houses, stables and other buildings my improved material will be found destructive of roaches, mosquitos, flies, bed bugs, lice and the like.

My invention comprises a mixture of slaked lime, arsenious oxid, and caustic soda (or caustic potash), well ground and mixed together in dry composition, in combination with some inert material such as, for example, wood or coal ashes.

The preferred composition of my improved insecticide is as follows:

| | |
|---|---|
| Slaked lime | 5 parts. |
| Arsenious oxid | 9 " |
| Caustic soda | 6 " |
| Wood or coal ashes | 80 " |

The composition is prepared, preferably, by grinding the individual constituents to a fine powder and then mixing them together. Or they may be mixed together and then ground. The grinding and mixing operations should be performed as quickly as possible to avoid the production of lumps, after which the materials should be placed in hermetically sealed containers to avoid absorption of water from the atmosphere.

In applying the material, the same may be dusted on the plants, or upon the ground surrounding the plants, by hand. I prefer, however, to use some form of blowing apparatus such as, for example, the conventional bellows device employed by gardeners.

The inert material used in my insecticide is employed as a transmitter or vehicle for the other constituents. This inert material prevents the other and more active constituents from agglomerating into small masses and diminishes the friction of their passage through the dusting apparatus. The function of the lime is to reduce the friction between the ashes or other inert vehicle and the small orifices of a powder gun. The lime may accordingly be considered as forming a part of the vehicle. Should it be desired to apply the material with the aid of a powder gun having large orifices, or with the aid of apparatus not having small orifices the lime may be omitted.

The wood or coal ashes may be substituted wholly or partly by ground rock phosphate which I find equally useful for the purpose stated.

It should be noted that the wood ashes or the rock phosphate, besides acting as a vehicle, also has valuable qualities as a fertilizer.

While I prefer that the constituents of my insecticide shall be in the proportions above stated, I may, within the spirit of my invention, vary these proportions without losing the beneficial results thereof.

Preferably the insecticide, if used on plants and vegetables, should be applied in the early morning or in the evening when the dew is still present. The moisture thereof will combine with the dusted powder, and a further amount of moisture will be absorbed from the atmosphere The foliage will thus become sticky and insects coming in contact therewith will have their parts smeared with and corroded by the caustic constituents of the mixture, thus hastening the absorption of the arsenious oxid which is probably the real death producing element.

Where the mixture is used inside of houses and other buildings, substantially the same action takes place, the mixture absorbing moisture from the atmosphere and acting upon the insect life in the same manner just above described.

My insecticide will also be found useful for the destruction of parasitic plants such as the mistletoe, and of poisonous plants such as the poison ivy. For this purpose, however, the number of parts of caustic soda should be increased and the number of parts of the inert transmitter, or vehicle, should be correspondingly decreased.

And when the insecticide is to be employed for destroying insects entirely apart from plant or vegetable life the number of parts of both the arsenious oxid and of the caustic soda may advantageously be increased, while the number of parts of the inert transmitter are correspondingly decreased. Thus, for this use, a desirable composition is as follows:

| | |
|---|---|
| Slaked lime | 5 parts. |
| Arsenious oxid | 15 " |
| Caustic soda | 10 " |
| Wood or coal ashes | 70 " |

Having described my invention, I claim:

1. An insecticide comprising a dry-mixed pulverulent composition comprising arsenious oxid and a caustic alkali as active ingredients in admixture with a pulverulent dry vehicle containing lime as a constituent, such active ingredients and vehicle being present in such proportions as to form a dry dusting insecticide, such mixture being in the form of a dry powder substantially free from lumps.

2. A dry insecticide comprising the product produced by grinding together in a dry state, about 9 to 15 parts of arsenious oxid and about 6 to 10 parts of a caustic alkali, in admixture with an inert dry finely divided solid vehicle and about 5 parts of slaked lime, said vehicle constituting not substantially less than 70 per cent. of the whole, said insecticide being in the form of a dry powder substantially free from lumps and capable of being applied in the form of a powder, by ordinary insect powder guns.

3. An insecticide comprising a dry-mixed pulverulent composition comprising arsenious oxid and a caustic alkali in admixture with an inert vehicle in such proportions as to form a dry dusting insecticide, such mixture being in the form of a dry powder substantially free from lumps.

In testimony whereof I have hereunto set my hand.

HUBERT A. RICHTER.